F. H. GIBBS.
TRUCK AND WHEEL ATTACHING DEVICE.
APPLICATION FILED JUNE 30, 1916.

1,199,779.

Patented Oct. 3, 1916.
2 SHEETS—SHEET 1.

Inventor
F. H. Gibbs

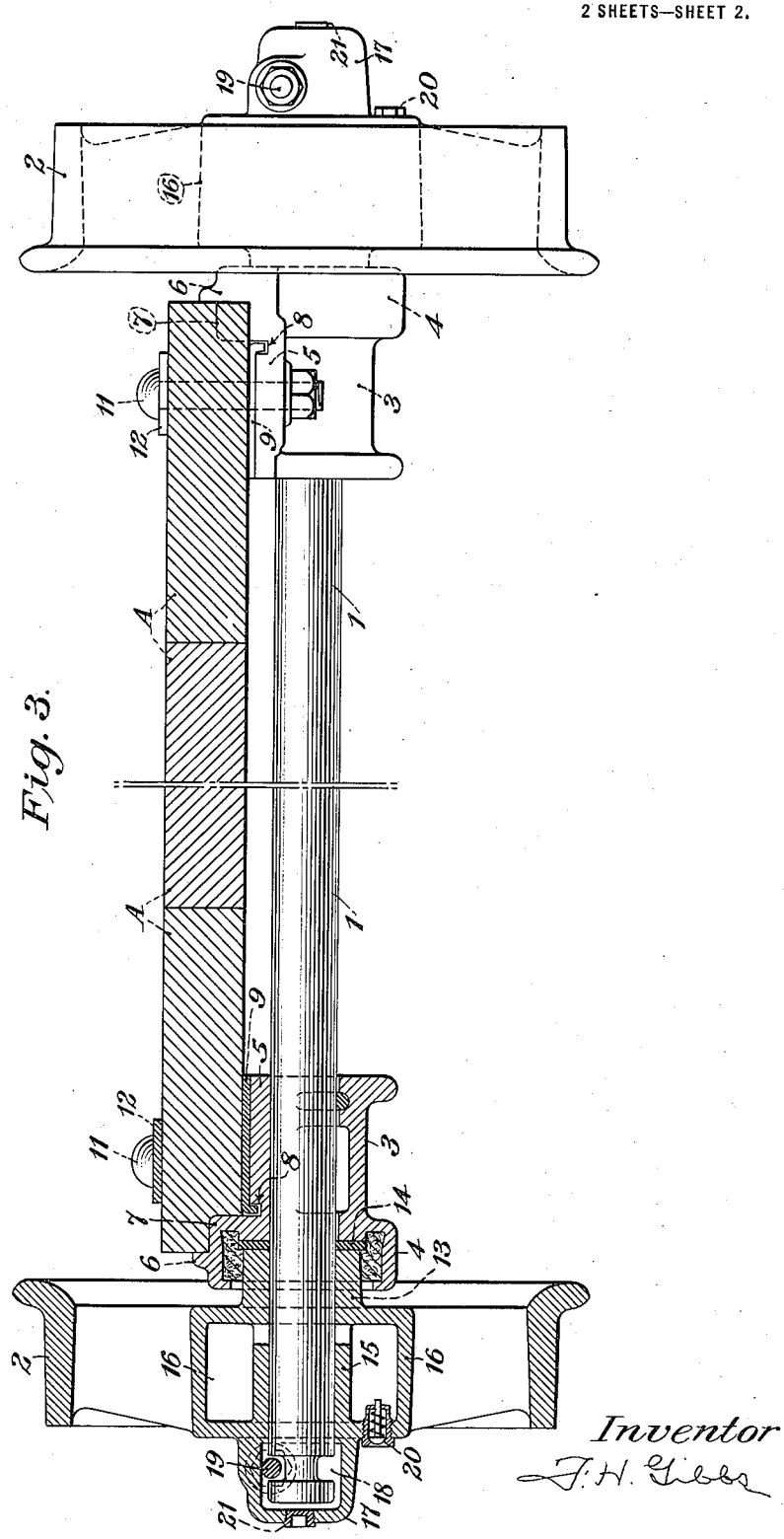

UNITED STATES PATENT OFFICE.

FREDERICK H. GIBBS, OF NEW YORK, N. Y., ASSIGNOR TO AMERICAN CAR AND FOUNDRY COMPANY, OF ST. LOUIS, MISSOURI, A CORPORATION OF NEW JERSEY.

TRUCK AND WHEEL-ATTACHING DEVICE.

1,199,779.   Specification of Letters Patent.   Patented Oct. 3, 1916.

Application filed June 30, 1916. Serial No. 106,873.

*To all whom it may concern:*

Be it known that I, FREDERICK H. GIBBS, residing at borough of Brooklyn, county of Kings, city and State of New York, and being a citizen of the United States, have invented certain new and useful Improvements in Truck and Wheel-Attaching Devices, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

Figure 1:
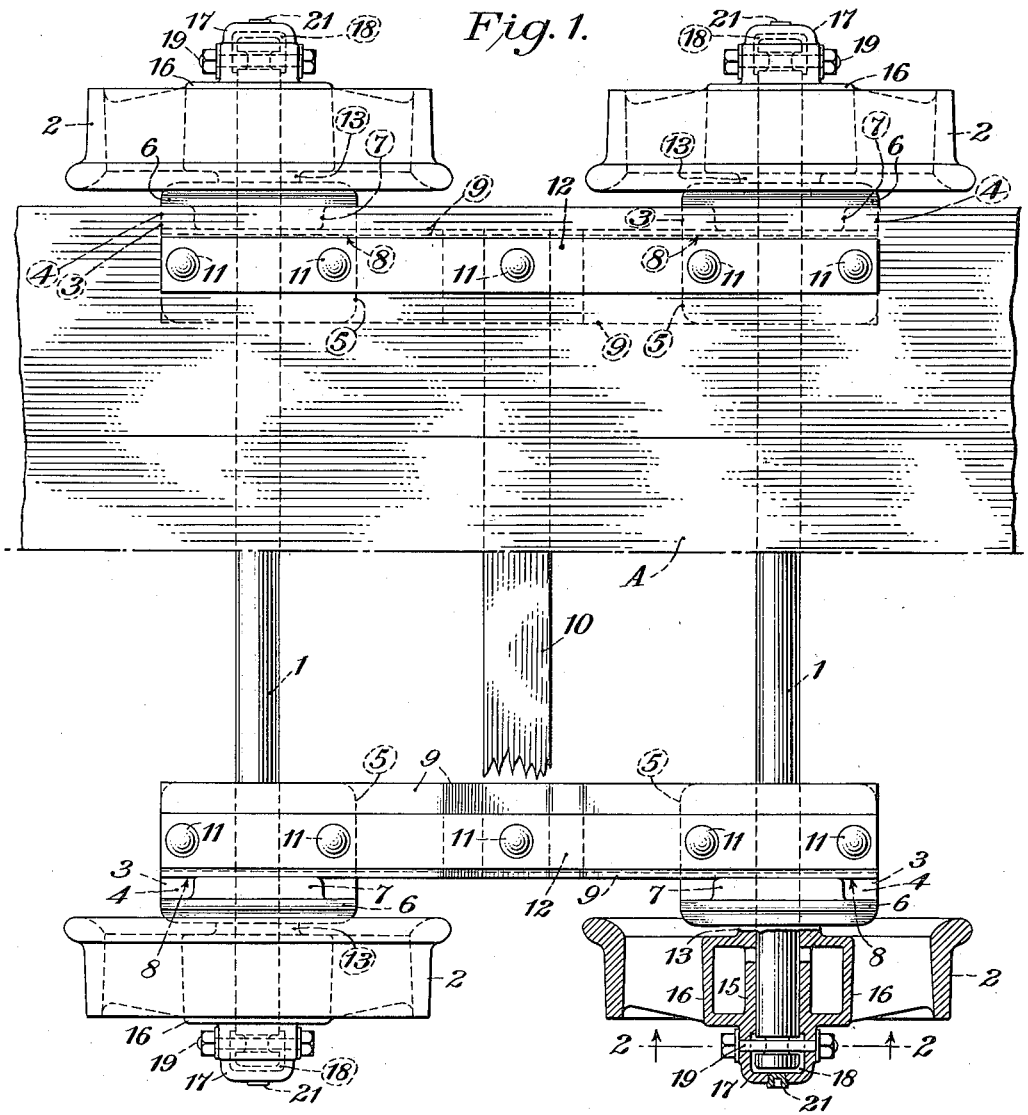
Figure 2:
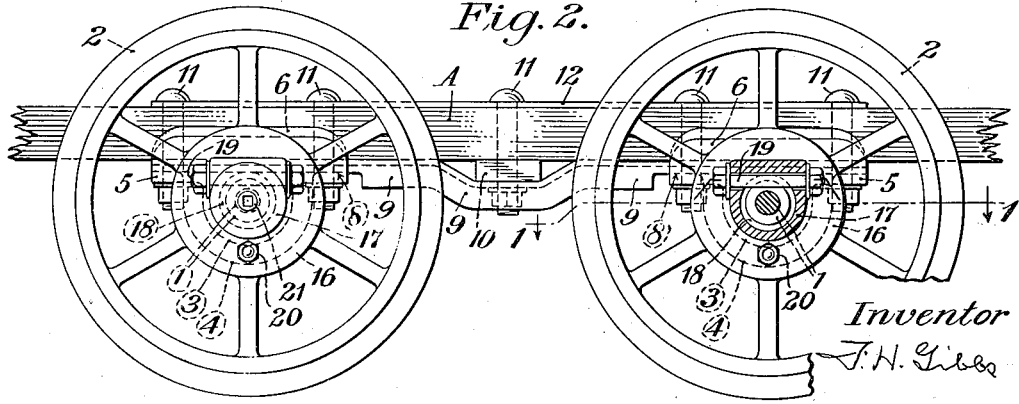

In said drawings: Figure 1 is a plan view of my improved truck showing part of the car floor in place and having one of the wheels shown in section, the section being substantially along the line 1—1 of Fig. 2. Fig. 2 is a side elevation of the truck, a portion of the hub of one of the wheels being in a vertical section, taken on the line 2—2 of Fig. 1. Fig. 3 is a composite view showing on the left a vertical transverse section through the truck and one of the wheels, and on the right an end elevation of the truck, the car floor being in section.

This invention relates to a railway truck of light but strongly connected parts, there being wheel-carrying axles mounted in suitable journal boxes. The journal boxes associated with the different axles are connected by journal box tie members which are arranged in pairs, the tie members connecting the journal boxes on one side of the truck being separable vertically for the interposition of the car flooring.

An object is to so form one of the tie members of an associated pair of such members as to accommodate a batten or transverse supporting beam extending from one side of the truck to the other intermediate the axles.

It is also an object to provide means for attaching the wheels to the axles so that they will be reliably retained, but may be easily removed. Due consideration is given to operating conditions and the wheels and the journal boxes are designed so as to be well lubricated. Special provision is made for housing the ends of the axles and making an attachment between the wheels and said axle ends which will permit of free rotation of the wheels while guarding against undue lateral displacement of the same with respect to the track. The means for attaching the wheels to the axle ends are arranged in such a combination that there will be no undesirable friction set up and special care is taken to lubricate this connection.

Such other features of merit as have not already been referred to, will become apparent hereinafter and are all to be considered as being included in the present invention.

Referring specifically to the parts, 1 represents the axles upon the outer ends of which are mounted wheels 2, secured in the manner hereinafter more fully referred to. Axles 1 pass through journal boxes 3, the lower half of the inner longitudinally directed portions of which are semi-cylindrical and the outer ends of which are provided with enlarged heads 4 having internal cylindrical recesses. The upper portion of each journal box is materially wider than any diameter of the lower portion thereof and is formed to constitute a horizontal seat 5 for a journal box tie strap upon which rests part of the car flooring A. At its outer side, the horizontal seat 5 of each journal box has formed with it an upstanding flange 6 providing an abutment for the side of one of the outer boards of the flooring A. The upper portion of the outer enlarged head 4 projects above the horizontal seat 5 of each journal box and in addition to accommodating the internal contour of the recess in head 4, forms a positioning projection 7 which, in each journal box, merges with said seat and the longitudinal abutment flange 6, and is adapted to project into a recess in the side of one of the outer boards of flooring A in such manner as to assist in interlocking the flooring with the journal boxes 3 when the truck and flooring are assembled. Along the inner face of the projection 7 of the journal box, is a groove 8 in and coextensive with the horizontal seat 5. Lower tie straps 9 connect the journal boxes at the sides of the truck, and each lower strap 9 lies upon the upper surfaces of seats 5 of the journal boxes on one side of the truck. Strap 9 for each tandem pair of journal boxes is provided with a down-turned flange which lies in grooves 8 of the connected boxes, said down-turned flange having greater altitude near the central portion of strap 9 than at the ends thereof, thus giving greater stiffness to strap 9 intermediate the supported ends thereof. At a suitable point or points, and, in the illustrated form, in the central portion of strap 9, the latter is depressed so as to leave space beneath the under side of flooring A and the upper surface of lower tie strap 9 at each side of the truck. A batten or stiffening and supporting beam 10 extends underneath flooring A and has its end portions inserted between the under side of said flooring and tie straps 9 at both sides of the truck. Suitable bolts 11, or other means, pass through upper tie straps 12 which are positioned over, and spaced above, lower tie straps 9, and also pass through flooring A, batten or beam 10, and the horizontal leg of strap 9, and are provided with nuts, which, when tightened, clamp the various parts tightly together. It will be understood that with the use of bolts 11, the space between the upper and lower journal box tie straps 12 and 9, respectively, may be readily adjusted to any thickness of flooring that may be desired in a particular design. Wheels 2, which are slipped over the opposite ends of axles 1, are provided with inner hub extensions 13, each of which extends into the recess in the enlarged journal box head portion 4 with which it is associated, there being a suitable washer 14 interposed between the inner face of said inner hub extension and an internal boss of the journal box 3. The hub of each wheel 2 is provided with an internal cylindrical bearing or axle bore-forming wall 15, which also forms the inner wall of an enlarged oil chamber 16 constituting part of the wheel hub, there being suitable apertures from the oil chamber communicating with axle 1. Projecting outwardly from oil chamber 16 is an outer hub extension 17 preferably formed integral with a wall of chamber 16 and which contains an oil cavity 18. The axle bore in each wheel 2 communicates with oil cavity 18 as well as with oil chamber 16 and the ends of axles 1 extend into oil cavities 18. The end portions of axles 1 which project into oil cavities 18 are each provided with an annular groove through which passes a locking key or bolt 19 which extends through opposite sides of the wall of outer hub extension 17. As shown, the locking keys are in the form of bolts and are provided with retaining nuts. Bolts 19 are tangentially arranged with respect to the grooves in axle 1 and are of such dimensions that they do not entirely fill the annular axle grooves, thereby allowing a small clearance for an automatic adjusting of the wheels when the flanges of the wheels are influenced by irregularities in the tracks. Clearance is also provided within the oil cavity entirely around the portion of the shaft which extends thereinto, eliminating friction in this part of the wheel.

Oil chamber 16 is provided with a lubricant inlet valve 20 and oil cavity 18 is provided with an independent lubricant inlet, normally closed by a plug 21 having a non-circular recess for a tool adapted to actuate the plug. The arrangement of the various portions of the wheel hub and the axle passing through the axle bore, is such that oil chamber 16 and oil cavity 18 are substantially independent of each other. Lubricant in oil chamber 16 is adapted to contact with axle 1 through apertures in the bearing or axle bore-forming annular wall 15. Such lubricant is capable of creeping along the axle in opposite directions so as to lubricate that portion of the axle which passes through the journal box and also that which is within the bore-forming wall 15. The only communication between oil chamber 16 and oil cavity 18 is the annular passage due to the clearance between the axle and the annular wall 15 which is adapted to allow a film of lubricant to extend along the shaft toward cavity 18. Lubricant in each cavity 18 is adapted to go between the walls of the annular groove of the end axle portion that extends into that cavity so that there may be a reduced frictional contact between locking bolts 19 and the groove walls of axles 1. As a consequence, the wear on the locking bolts 19 is negligible. Also lubricant in cavity 18 will, to some extent, assist in lubricating the outer ends of axles 1 within bore-forming wall 15. It is to be noted that the practical separation of oil chamber 16 and oil cavity 18 prevents the oil in the cavity from ever draining into the oil chamber and thus depriving the bolt and axle groove connection of suitable lubrication.

What I claim is:

1. In combination in a truck, a wheel provided with a hub containing a pair of separate lubricant compartments, each provided with an independent inlet port, a closure for each port, an axle extending through said hub and having an annularly grooved end portion in one of said compartments and a key locked to the walls of the last mentioned compartment and passing through the axle groove to retain said wheel.

2. In combination in a truck, a wheel provided with a hub having a main lubricant compartment and a hub extension having another compartment, means of independent access to each compartment, an axle extending through said hub and having an annularly grooved end portion projecting into the compartment in said hub extension without engaging the wall thereof, and a key passing through and locked to said wall and extending through the axle groove to retain said wheel.

3. In combination in a truck, wheels each provided with a hub containing a chamber and a distinct cavity, each adapted to be independently supplied with lubricant, axles extending through the wheel hubs and into said cavities and being provided with annular grooves in the portions occupying said cavities, the latter portions being held out of contact with the walls of said cavities, keys locked to the walls of said cavities and seated in said axle grooves, and truck-forming elements maintaining said axles in parallelism.

4. In combination in a truck, wheels each provided with a hub containing a lubricant chamber and a lubricant cavity distinct from said chamber, there being an axle bore in communication with said chamber and cavity, axles passing through the wheel bores and having annularly grooved end portions in the lubricant cavities, there being a passage between said chambers and cavities only for a lubricant-film on said axles, closures for lubricant inlet ports independently located in the chamber and cavity, respectively, of each wheel, locking keys secured to the walls of said cavities and tangentially disposed to and in the axle grooves, and truck-forming elements maintaining said wheels and axles in operative positions.

In witness whereof I have hereunto set my hand in the presence of two witnesses.

FREDERICK H. GIBBS.

Witnesses:
    FLORA M. CURTIS,
    CHARLES L. BELCHER.